M. A. ANCHERSEN.
MACHINE FOR FORMING PEAT FUEL BLOCKS.
APPLICATION FILED DEC. 21, 1917.

1,294,218.

Patented Feb. 11, 1919.
2 SHEETS—SHEET 1.

M. A. ANCHERSEN.
MACHINE FOR FORMING PEAT FUEL BLOCKS.
APPLICATION FILED DEC. 21, 1917.

1,294,218.

Patented Feb. 11, 1919.
2 SHEETS—SHEET 2.

UNITED STATES PATENT OFFICE.

MARTIN ANTON ANCHERSEN, OF KLOSTERLUND, PER ENGESVANG, DENMARK.

MACHINE FOR FORMING PEAT FUEL-BLOCKS.

1,294,218.  Specification of Letters Patent.  Patented Feb. 11, 1919.

Application filed December 21, 1917. Serial No. 208,295.

*To all whom it may concern:*

Be it known that I, MARTIN ANTON ANCHERSEN, residing at Klosterlund, per Engesvang, Denmark, a subject of the King of Denmark, have invented certain new and useful Improvements in Machines for Forming Peat Fuel-Blocks, whereof the following is a specification.

This invention relates to a machine adapted to traverse the field or bed of plastic peat, mire, mud or turf and cut or form the material into block shapes.

In the peat industry and especially in cases where the fields or beds to be worked are of small area and large and expensive machines are not practical, peat or peat blocks are produced by means of plain wooden forms having recangular openings of the size the finished peat or peat blocks usually have. These wooden forms or frames are placed out on an even field where the wet kneaded peat-mass is spread out, and pressed into said mass, the peat filling the openings of the form and the walls of said openings serving to cut or divide the bed of peat. A scraper is then passed over the top of the frame and the peat leveled even with said top edge. The frame is then removed, leaving the peat in molded mounds or blocks.

This manner of proceeding, however, is slow, and rather laborious, being exceedingly tiring for the workman. Further the wooden forms are liable to rot in the course of a few years, which is especially due to the continuous changing from dry to wet state, the forms becoming soaked during the process, and when not in use quickly dry. It is therefore often necessary to renew these forms, and as of course a great number are in use, such renewal is very costly.

In order to remedy these deficiencies, machines have been constructed, fitted with two sets of cutters for cutting the peat at two right angled directions. Such machines are, however, rather expensive and consume a comparatively great amount of power. Further the cutting implements leave an interval of only a few millimeters between the cut peat, and in damp or rainy weather this space is soon filled with water, causing the peat to flow together again to a continuous cake.

The object of this invention is to provide a machine which, avoiding the objections above stated, will be of simple construction, adapted for use in small fields or beds or bogs and requiring small expenditure of power in its operation.

In the accompanying drawings.

Similar reference numbers indicate corresponding parts in the different figures.

Figure 1:
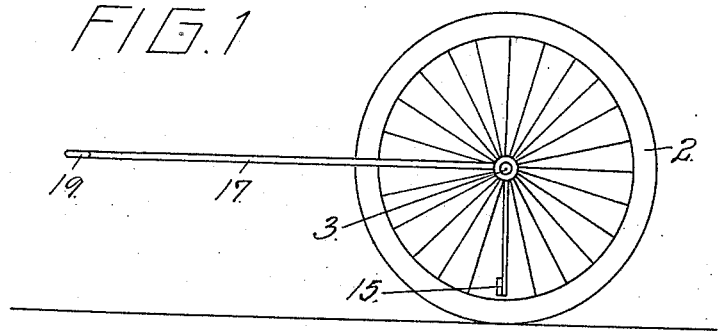
Figure 1 represents a side elevation of an embodiment of this invention adapted to be operated by man power.

In the form of embodiment illustrated in Fig. 1, two wheels 1 and 2 are mounted at opposite ends of an axle 3 and a skeleton roller is connected at opposite ends with said wheels and spans the space between them. This skeleton roller is in cylindrical form and composed of a circular series of longitudinal slats such as 4, 5, 6 running parallel with the axle and connected at their opposite ends to the rims of said wheels. A series of peripheral rings as 7, 8 and 9 are disposed at intervals between the ends of the roller. These several rings are composed preferably of short partitions inserted between the slats 4, 5, 6 etc. These slats and rings form rectangular open pockets 30 throughout the circumference of the roller. The pockets serve as molds or forms for cutting or shaping the plastic peat into blocks as the skeleton roller is made to traverse the field or bed thereof. The slats 4, 5, 6 are not disposed radially, but are inclined slightly at an acute angle to the radii of the roller, their outer edges being slightly in advance of their inner edges to adapt them to the advancing movement of the roller. By this construction the sides of the peat blocks formed by these slats are cut as nearly as possible at right angles to the tops and bottoms thereof as the roller makes its traverse.

Means are provided for shaping or smoothing the inner faces of the blocks at the inner open ends of the pockets and removing the surplus peat. This means in the form illustrated, comprises a scraper composed of dependent arms 13 and 14 fixed within the roller on the axle 3 near opposite ends thereof and a longitudinal blade 15 attached at its opposite ends to the lower ends of said dependent arms and disposed near the inner circumference of the circular series of pockets of the skeleton roller.

Shafts 16 and 17 are attached to the axle at its opposite ends outside the roller and these shafts are provided at their outer ends with handles 18 and 19 for manual operation of the machine.

Figure 4:
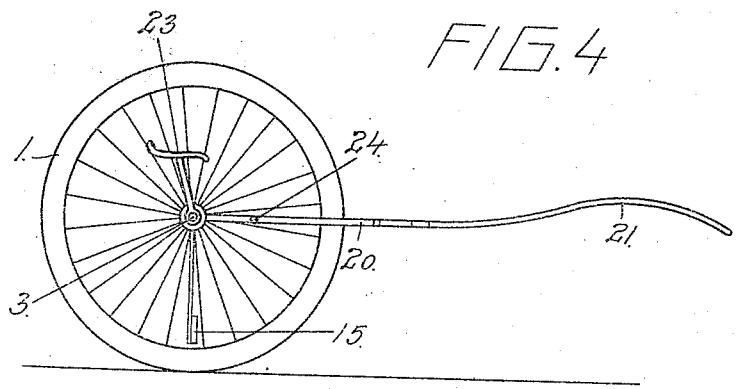
Fig. 4 represents a side elevation of an embodiment of this invention adapted for operation by horse power.
Figure 5:
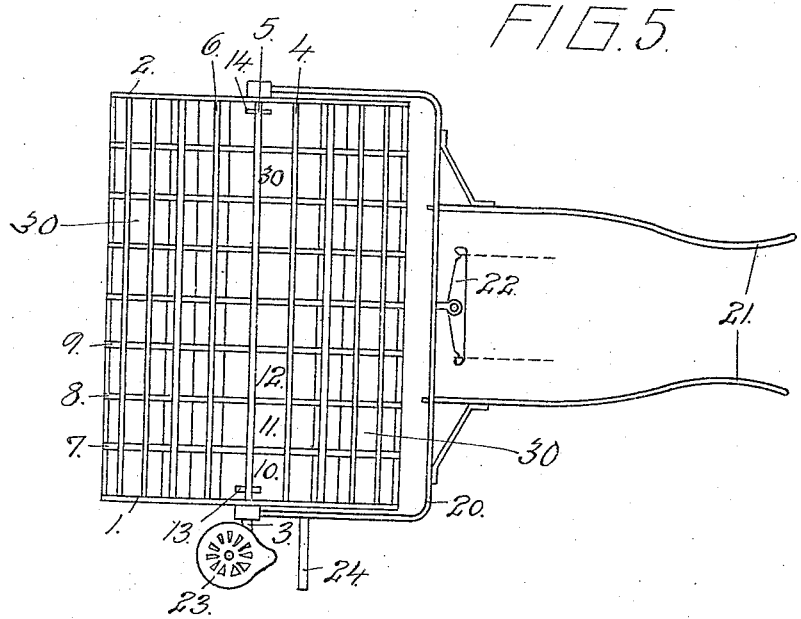
Fig. 5 represents a plan view thereof.

The embodiment shown in Figs. 4 and 5 is similar to that already described excepting that the manual shafts are omitted and means are substituted for applying horse power to the machine. In this form a U-shaped bar 20 is connected to opposite ends of the axle and spans the roller. This bar is provided with single horse shafts 21 and a swingletree 22. A driver's seat 23 is mounted at one end of the axle 3 and a foot board is attached to the U-bar adjacent to said seat.

Figure 2:
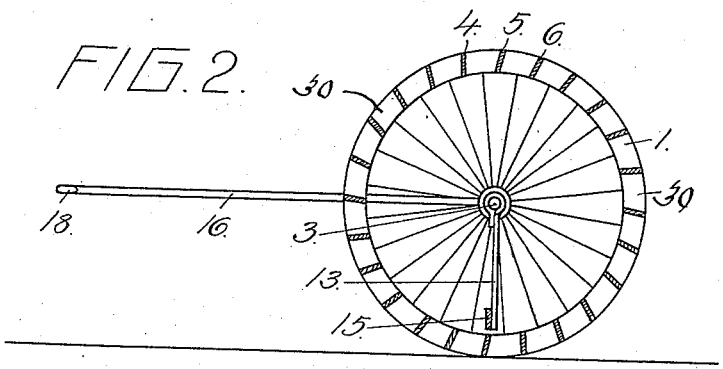
Fig. 2 represents a transverse section thereof.
Figure 3:
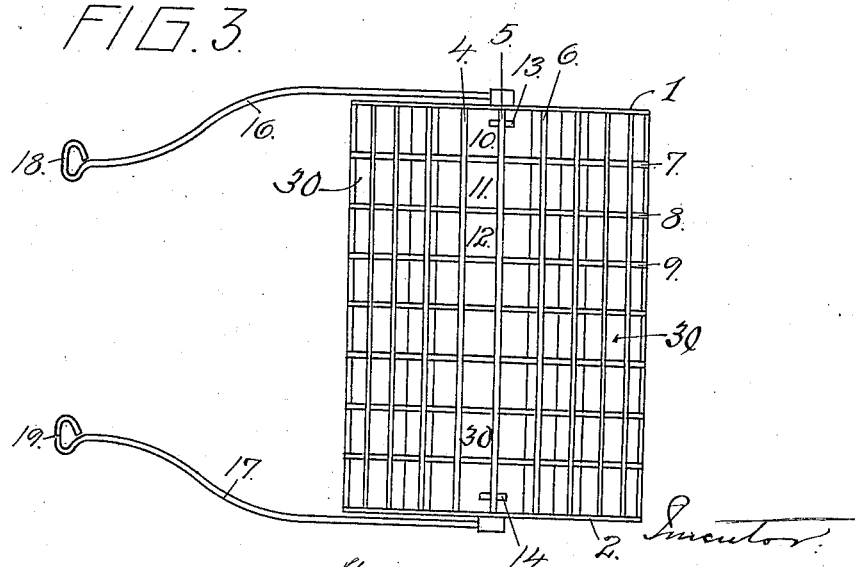
Fig. 3 represents a plan thereof.

In the use of the machine illustrated in Figs. 1 to 3, a man operator grasps the handles 18 and 19 of the shaft and draws the machine forward. In its movement forward the roller traverses the bed of peat. The weight of the roller causes the skeleton roller to sink into the plastic mass of peat and the walls of the pockets cut it into blocks corresponding in shape with the pockets. Any surplus peat which projects through the open ends of the pockets or molds at the inner periphery of the roller is scraped off by the scraping blade 15 and the inner faces of the blocks are properly shaped thereby.

In the use of the machine shown in Figs. 4 and 5, a horse is hitched up to said machine and the operator sitting on the driver's seat rides with and guides the machine. In this case the operation of the skeleton roller is the same as that of the hand machine.

I claim as my invention:

1. A peat block forming machine comprising a skeleton roller having a series of peripheral pockets open at their inner and outer faces and adapted to sink into and shape the peat on traversing a bed thereof, means for scraping off the surplus peat at the inner faces of said pockets, and means for operating said roller.

2. A peat block forming machine comprising a skeleton roller having a series of peripheral pockets adapted to sink into and shape the peat on traversing a bed thereof, walls of said pockets which are transverse to the line of travel, being disposed at an angle to the radii of the roller, the outer edges being slightly in advance of the inner edges thereof, and means for operating said roller.

3. A peat block forming machine comprising a skeleton roller having a series of peripheral pockets adapted to sink into and shape the peat on traversing a bed thereof, the walls of said pockets which are transverse to the line of travel being disposed at an angle to the radii of the roller, the outer edges being slightly in advance of the inner edges thereof, means for scraping off the surplus peat at the inner faces of said pockets, and means for operating said roller.

4. A peat block forming machine comprising a skeleton roller adapted to traverse a bed of peat and provided with a series of perpiheral pockets open at their inner and outer faces and adapted to sink into and shape the peat on traversing a bed thereof, means for scraping off the surplus peat at the inner faces of said pockets, and shafts connected with the opposite ends of the axles of said roller whereby it may be pulled over said bed.

In testimony whereof I affix my signature in the presence of two witnesses.

MARTIN ANTON ANCHERSEN.

Witnesses:
JOHAN LUDVIG PETER PLESS,
ERNST JENSEN.